US010261278B1

(12) United States Patent
    Murthy et al.

(10) Patent No.: US 10,261,278 B1
(45) Date of Patent: Apr. 16, 2019

(54) OPTICAL FIBER CABLE WITH DUAL LAYER BUFFER TUBE FOR MICRODUCT APPLICATION

(71) Applicant: Sterlite Technologies Limited, Aurangabad (IN)

(72) Inventors: Venkatesh Murthy, Aurangabad (IN); Kishore Sahoo, Aurangabad (IN); Atul Mishra, Aurangabad (IN); Kavya Chintada, Aurangabad (IN)

(73) Assignee: STERLITE TECHNOLOGIES LIMITED, Aurangabad, MH (IN)

( * ) Notice: Subject to any disclaimer, the term of this patent is extended or adjusted under 35 U.S.C. 154(b) by 0 days.

(21) Appl. No.: 16/158,484

(22) Filed: Oct. 12, 2018

(51) Int. Cl.
    *G02B 6/44* (2006.01)
    *G02B 6/52* (2006.01)

(52) U.S. Cl.
    CPC ......... *G02B 6/4434* (2013.01); *G02B 6/4413* (2013.01); *G02B 6/4415* (2013.01); *G02B 6/4482* (2013.01); *G02B 6/4494* (2013.01); *G02B 6/4495* (2013.01); *G02B 6/4464* (2013.01); *G02B 6/52* (2013.01)

(58) Field of Classification Search
    None
    See application file for complete search history.

(56) References Cited

U.S. PATENT DOCUMENTS

| 4,664,472 | A | * | 5/1987 | Mayr | G02B 6/4486 |
| | | | | | 385/109 |
| 5,343,549 | A | * | 8/1994 | Nave | G02B 6/4434 |
| | | | | | 385/103 |
| 5,408,561 | A | * | 4/1995 | McCallum, III | G02B 6/441 |
| | | | | | 385/109 |
| 5,761,362 | A | * | 6/1998 | Yang | G02B 6/441 |
| | | | | | 385/109 |
| 2005/0281517 | A1 | * | 12/2005 | Wessels, Jr. | G02B 6/4429 |
| | | | | | 385/109 |
| 2006/0127014 | A1 | * | 6/2006 | Ledbetter | G02B 6/4494 |
| | | | | | 385/109 |

* cited by examiner

*Primary Examiner* — Michael Stahl

(57) ABSTRACT

The present disclosure provides an optical fiber cable. The optical fiber cable includes a central strength member. The central strength member lies substantially along a longitudinal axis of the optical fiber cable. In addition, the optical fiber cable includes a first layer. The first layer includes a plurality of water swellable yarns. Further, the optical fiber cable includes a plurality buffer tubes. Each of the plurality of buffer tubes includes a plurality of optical fiber. Moreover, the optical fiber cable includes a second layer of a pair of binder yarns. Further, the optical fiber cable includes a third layer. The third layer is formed of a plurality of water swellable yarns. The optical fiber cable includes a fourth layer. The fourth layer is a sheath layer.

19 Claims, 2 Drawing Sheets

OPTICAL FIBER CABLE WITH DUAL LAYER BUFFER TUBE FOR MICRODUCT APPLICATION

TECHNICAL FIELD

The present disclosure relates to the field of optical fiber cable and, in particular, relates to a micro optical fiber cable for installation in ducts. The present application is based on, and claims priority from an Indian Application Number 201721036545, filed on 13 Oct. 2017 the disclosure of which is hereby incorporated by reference herein.

BACKGROUND

Over the last few years, there has been a rapid growth in the use of optical fiber cables. One such type of optical fiber cables are air blown optical fiber cables. These air blown optical fiber cables are used for various indoor-outdoor applications. The air blown optical fiber cables are installed inducts/microduct. Traditionally, the air blown optical fiber cables are installed by blowing the optical fiber cable into a duct/microduct while simultaneously pushing the optical cable into the duct in starting length of cable to support the initial blowing of the optical fiber cable. The blowing is done by injecting a high volume of compressed air into the duct which flows inside the duct at high speed. Accordingly, the high speed air propels the optical fiber cable further inside the duct. The optical fiber cable is blown with a cable blowing machine. Typically, the structure of these air blown optical fiber cables includes a number of buffer tubes. The buffer tubes are stranded around a central strength member in an S-Z fashion. In addition, the buffer tubes are enclosed by a sheathing layer for providing protection to the air blown optical fiber cable. Typically, the buffer tubes are formed using polybutylene terephthalate, PA-12 or polypropylene. Further, the buffer tubes are single layer buffer tubes.

The currently available air blown optical fiber cables have certain drawbacks. The existing air blown optical fiber cables limits blowing distance and speed for installation in smaller ducts due to the large diameter. In addition, the single layer design of the buffer tubes leads to a higher thickness of the buffer tubes. The higher thickness of the buffer tubes results in a large diameter of the buffer tubes. Accordingly, the large diameter of the buffer tubes leads to large diameter of the air blown optical fiber cables. Further, the conventionally available air blown optical fiber cables with large optical fiber diameter with single layer buffer tubes is large diameter optical fiber cable. This affects the blowing performance of the air blown optical fiber cables into a duct of predefined size. These air blown optical fiber cables with large diameter are difficult to blow for large distances in the predefined duct size. Therefore, the conventionally available optical fiber cables of this kind are blown into duct of higher size. Furthermore, the existing optical fiber cables use optical fiber having a diameter of about 200 microns to reduce the overall diameter of the optical fiber cable to serve the purpose of duct size.

In light of the foregoing discussion, there exists a need for an optical fiber cable which overcomes the above cited drawbacks of conventionally known optical fiber cables.

SUMMARY

In an aspect, the present disclosure provides an optical fiber cable. The optical fiber cable includes a central strength member lying substantially along a longitudinal axis of the optical fiber cable. The optical fiber cable includes a first layer wrapped helically around the central strength member. The optical fiber cable includes a plurality of buffer tubes stranded helically around the first layer. Each of the plurality of buffer tubes encloses a plurality of optical fibers. The optical fiber cable includes a second layer cross helically positioned around a core of the optical fiber cable. The optical fiber cable includes a third layer wrapped helically around the core of the optical fiber cable. The optical fiber cable includes a fourth layer surrounding the third layer. The central strength member is formed of fibre reinforced plastic. The central strength member has a diameter of about 3 mm. The first layer is a plurality of water swellable yarns. Each of the plurality of buffer tubes is formed of a combination of two sub layers having different material. Each of the plurality of buffer tubes has a first sub layer and a second sub layer. The first sub layer is formed of polycarbonate. The first sub layer is the inner sub layer of the buffer tube. The second sub layer is formed of polybutylene terephthalate. The second sub layer is the outer sub layer of the buffer tube. The second layer is formed of a pair of binder yarns. The pair of binder yarn includes a first binder yarn wrapped helically in clockwise direction and a second binder yarn wrapped helically in anti-clockwise direction. The third layer is formed of a plurality of water swellable yarns. The fourth layer is formed of high density polyethylene. The optical fiber cable has a diameter of about 7.7 mm±0.2 mm.

In an embodiment of the present disclosure, each of the plurality of buffer tubes has a first diameter of about 1.55 mm±0.05 mm. Each of the plurality of buffer tubes has a second diameter of about 1.85 mm±0.05 mm.

In an embodiment of the present disclosure, the first sub layer has a thickness of about 75 microns±10 microns. The first sub layer has a density of about 1.2 gm/cm$^3$.

In an embodiment of the present disclosure, the second sub layer has a thickness of about 75 microns±10 microns. The second sub layer has a density of about 1.31 gm/cm$^3$.

In an embodiment of the present disclosure, the plurality of buffer tubes being eight. The plurality of optical fibers in each of the plurality of buffer tubes is twenty four. Each of the plurality of optical fibers has a diameter of about 250 microns.

In an embodiment of the present disclosure, the optical fiber cable includes a plurality of ripcords. Each of the plurality of ripcords is high strength water blocking type yarns.

In an embodiment of the present disclosure, the fourth layer has a thickness in the range of about 0.4 mm to 0.6 mm, wherein the fourth layer has a density in the range of about 0.90 gm/cm$^3$ to 0.96 gm/cm$^3$.

In an embodiment of the present disclosure, the central strength member is a solid pultrusion type fiber reinforced plastic. The central strength member is coated with a polyethylene layer. The central strength member is coated to accommodate plurality of buffer tubes.

In an embodiment of the present disclosure, the first binder yarn is aramid binder yarn and the second binder yarn is aramid binder yarn.

In an embodiment of the present disclosure, the binder yarn is water blocking type aramid yarn.

In an embodiment of the present disclosure, further include a plurality of ripcord. The plurality of ripcords is positioned below the fourth layer and along with the third layer in linear manner.

In an embodiment of the present disclosure, the optical fiber cable is blown into a duct having an inner diameter of about 10 mm and outer diameter of about 14 mm. The optical fiber cable when blown into duct having an inner diameter of 10 mm and outer diameter of 14 mm has a fill factor in a range of about 54% to 64%.

In an embodiment of the present disclosure, the buffer tube has a packing factor in a range of about 75% to 92%. The buffer tube has packing factor which is defined as ratio of equivalent cross sectional area of fiber bunch to inner cross sectional area of the buffer tube. The equivalent cross sectional area is the area formed by equivalent diameter of fiber bunch which is calculated by formula, 1.155*Square root of number fibers per tube*Diameter of the fiber.

In another aspect, the present disclosure provides an optical fiber cable. The optical fiber cable includes a central strength member lying substantially along a longitudinal axis of the optical fiber cable. The optical fiber cable includes a first layer wrapped helically around the central strength member. The optical fiber cable includes a plurality of buffer tubes stranded helically around the first layer. Each of the plurality of buffer tubes encloses a plurality of optical fibers. The optical fiber cable includes a second layer cross helically positioned around the core of the optical fiber cable. The optical fiber cable includes a third layer wrapped helically around the core of the optical fiber cable. The optical fiber cable includes a fourth layer surrounding the third layer. The central strength member is formed of fibre reinforced plastic. The central strength member has a diameter of about 3 mm. The first layer is a plurality of water swellable yarns. Each of the plurality of buffer tubes has a first diameter of about 1.55 mm±0.05 mm. Each of the plurality of buffer tubes has a second diameter of about 1.85 mm±0.05 mm. Each of the plurality of buffer tubes is formed of a combination of two sub layers having different material. Each of the plurality of buffer tubes has a first sub layer and a second sub layer. The first sub layer is formed of polycarbonate. The first sub layer is the inner sub layer of the buffer tube. The second sub layer is formed of polybutylene terephthalate. The second sub layer is the outer sub layer of the buffer tube. The second layer is formed of a pair of binder yarns. The pair of binder yarn includes a first binder yarn wrapped helically in clockwise direction and a second binder yarn wrapped helically in anti-clockwise direction. The third layer is formed of a plurality of water swellable yarns. The fourth layer is formed of high density polyethylene. The fourth layer has a thickness in the range of about 0.4 mm to 0.6 mm. The fourth layer has a density in the range of about 0.90 gm/cm3 to 0.96 gm/cm3. The optical fiber cable has a diameter of about 7.7 mm±0.2 mm.

In yet another aspect, the present disclosure provides an optical fiber cable. The optical fiber cable includes a central strength member lying substantially along a longitudinal axis of the optical fiber cable. The optical fiber cable includes a first layer wrapped helically around the central strength member. The optical fiber cable includes a plurality of buffer tubes stranded helically around the first layer. Each of the plurality of buffer tubes encloses a plurality of optical fibers. The optical fiber cable includes a second layer cross helically positioned around the core of the optical fiber cable. The optical fiber cable includes a third layer wrapped helically around the core of the optical fiber cable. The optical fiber cable includes a fourth layer surrounding the third layer. The central strength member is formed of fibre reinforced plastic. The central strength member has a diameter of about 3 mm. The first layer is a plurality of water swellable yarns. Each of the plurality of buffer tubes has a first diameter of about 1.55 mm±0.05 mm. Each of the plurality of buffer tubes has a second diameter of about 1.85 mm±0.05 mm. Each of the plurality of buffer tubes is formed of a combination of two sub layers having different material. Each of the plurality of buffer tubes has a first sub layer and a second sub layer. The first sub layer is formed of polycarbonate. The first sub layer is the inner sub layer of the buffer tube. The first sub layer has a thickness of about 75 microns±10 microns. The first sub layer has a density of about 1.2 gm/cm³. The second sub layer is formed of polybutylene terephthalate. The second sub layer is the outer sub layer of the buffer tube. The second sub layer has a thickness of about 75 microns±10 microns, wherein the second sub layer has a density of about 1.31 gm/cm³. Each of the plurality of buffer tubes encloses a plurality of optical fibers. The plurality of buffer tubes being eight. The plurality of optical fibers in each of the plurality of buffer tubes is twenty four. Each of the plurality of optical fibers has a diameter of about 250 microns. The second layer is formed of a pair of binder yarns. The pair of binder yarn includes a first binder yarn wrapped helically in clockwise direction and a second binder yarn wrapped helically in anti-clockwise direction. The third layer is formed of a plurality of water swellable yarns. The fourth layer is formed of high density polyethylene. The fourth layer has a thickness in the range of about 0.4 mm to 0.6 mm. The fourth layer has a density in the range of about 0.90 gm/cm3 to 0.96 gm/cm³. The optical fiber cable has a diameter of about 7.7 mm±0.2 mm.

BRIEF DESCRIPTION OF FIGURES

Figure 1:
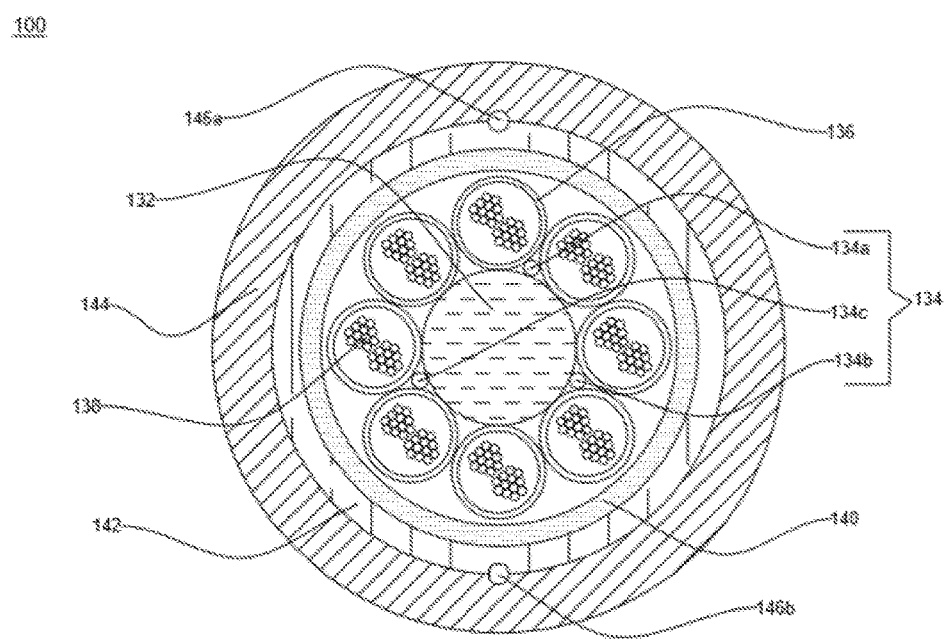
Figure 2:
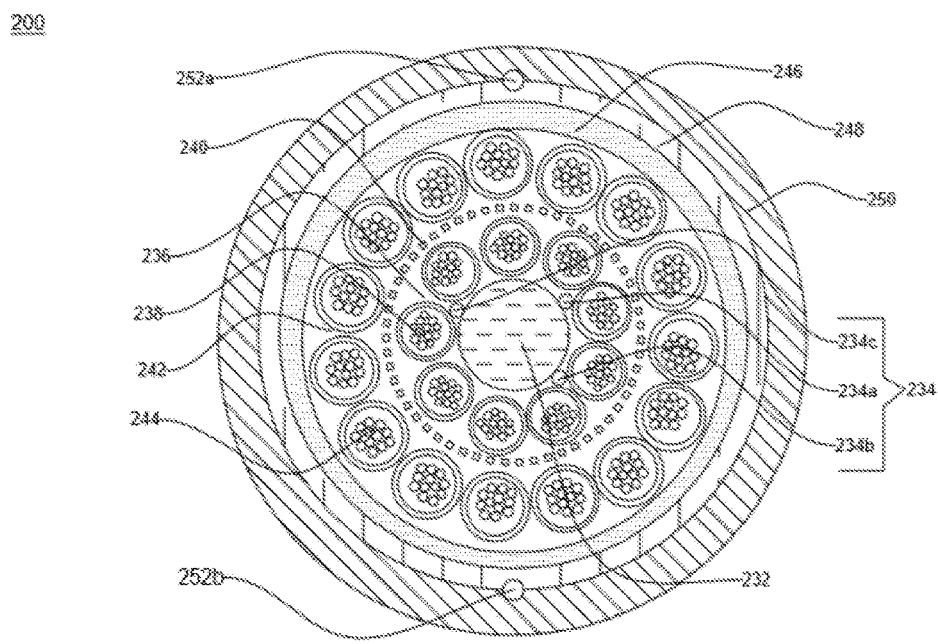

Having thus described the disclosure in general terms, reference will now be formed to the accompanying figures, wherein:

FIG. 1 illustrates a cross sectional view of an optical fiber cable, in accordance with an embodiment of the present disclosure; and FIG. 2 illustrates a cross sectional view of an optical fiber cable, in accordance with another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be formed in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an"

herein do not denote a limitation of quantity, but rather denote the presence of at least one of the referenced item.

FIG. 1 illustrates a cross sectional view of an optical fiber cable 100, in accordance with various embodiments of the present disclosure. The optical fiber cable 100 is a micro optical fiber cable. The optical fiber cable 100 is used for installation in micro ducts. In addition, the optical fiber cable 100 is used for underground installations. Also, the optical fiber cable 100 is used for communication, and the like. In an embodiment of the present disclosure, the optical fiber cable 100 is a 192F micro optical fiber cable. In addition, 192F corresponds to 192 optical fibers. Further, the optical fiber cable 100 has a small diameter which makes the optical fiber cable 100 suitable for installation in the smaller micro ducts.

The optical fiber cable 100 is formed of a plurality of layers (mentioned below in the patent application). The optical fiber cable encloses plurality of buffer tubes each formed of two sub layers having different material and thickness. Each of the plurality of buffer tubes encloses a plurality of optical fibers. In an embodiment of the present disclosure, the plurality of optical fibers is loosely held inside the each of the plurality of buffer tubes. In an embodiment of the present disclosure, each of the plurality of buffer tubes has a small diameter (mentioned below in the patent application). Further, the optical fiber cable 100 has a reduced cable diameter (provided below in the patent application).

The optical fiber cable 100 includes a central strength member 132, a first layer 134, a plurality of buffer tubes 136 and a plurality of optical fibers 138. In addition, the optical fiber cable 100 includes a second layer 140, a third layer 142 and a fourth layer 144. Further, the optical fiber cable 100 includes a plurality of ripcords 146a-146b.

The optical fiber cable 100 includes the central strength member 132. The central strength member 132 lies substantially along a longitudinal axis of the optical fiber cable 100. In an embodiment of the present disclosure, the central strength member 132 is formed of fiber reinforced plastic. The central strength member 132 is a solid pultrusion type fiber reinforced plastic. The fiber reinforced plastic is a composite material having a polymer matrix reinforced with glass fibers. In an example, the fiber reinforced plastics includes but may not be limited to glass fibers, carbon fibers, aramid fibers, basalt fibers and the like. In another embodiment of the present disclosure, the central strength member 132 is formed of any other suitable material. In an embodiment of the present disclosure, the central strength member 132 may be coated with a layer of polyethylene. The central strength member 132 is coated to accommodate the plurality of buffer tubes around it. In another embodiment of the present disclosure, the central strength member may be coated with any other suitable material. In yet another embodiment of the present disclosure, the central strength member 132 may not be coated. In an embodiment of the present disclosure, the central strength member 132 has a circular cross-section.

The central strength member 132 provides physical strength to the optical fiber cable 100 and resists over bending of the optical fiber cable 100. In addition, the central strength member 132 provides tensile strength to the optical fiber cable 100. The tensile strength corresponds to a resistance shown by the optical fiber cable 100 against longitudinal loads. The central strength member 132 is characterized by a diameter measured along the cross section. In an embodiment of the present disclosure, the diameter of the central strength member 132 is about 3 millimeters. In another embodiment of the present disclosure, the diameter of the central strength member 132 may vary.

The optical fiber cable 100 includes the first layer 134. The first layer 134 surrounds the central strength member 132. The first layer 134 is formed of a plurality of water swellable yarns 134a-134c helically disposed around the central strength member 132 and the plurality of buffer tubes 136. The plurality of water swellable yarns 134a-134c prevents ingression of water inside a core of the optical fiber cable 100. In an embodiment of the present disclosure, the number of water swellable yarns present in the first layer 134 is 3. In another embodiment of the present disclosure, the number of water swellable yarns present in the first layer 134 may vary.

The optical fiber cable 100 includes the plurality buffer tubes 136. The plurality of buffer tubes 136 is stranded around the first layer 134 in a helical fashion.

The cross section of each of the plurality of buffer tubes 136 is circular in shape. In an embodiment of the present disclosure, the cross section of each of the plurality of buffer tubes 136 may be of any suitable shape. In an embodiment of the present disclosure, each of the plurality of buffer tubes 136 has a uniform structure and dimensions. In an embodiment of the present disclosure, the plurality of buffer tubes 136 includes 8 buffer tubes. Each of the plurality of buffer tubes 136 is having two sub layers. Two sub layers include a first sub layer and a second sub layer. The first sub layer is the inner sub layer and the second sub layer is the outer sub layer. Each sub layer is formed of a different material. Each sub layer has a different thickness. Each sub layer has a different density. The inner sub layer is formed of polycarbonate having a density of about 1.2 gm/cm$^3$. In general, polycarbonates are a group of thermoplastic containing carbonate groups in chemical structure. The inner sub layer has a thickness of about of about 75 microns±10 microns. The outer sub layer is formed of polybutylene terephthalate. The second sub layer has a density of about 1.31 gm/cm$^3$. The second sub layer has a thickness of about 75 microns±10 microns. In another embodiment of the present disclosure the thickness and density of the inner sub layer and the outer sub layer may vary.

Furthermore, each of the plurality of buffer tubes 136 has a first diameter and a second diameter. In an embodiment of the present disclosure, the first diameter and the second diameter of each of the plurality of buffer tubes 136 is fixed. In an embodiment of the present disclosure, the first diameter of each of the plurality buffer tubes 136 is about 1.55 mm±0.05 mm. In another embodiment of the present disclosure, the first diameter of each of the plurality of buffer tubes 136 may vary. In an embodiment of the present disclosure, the second diameter of each of the plurality of buffer tubes 136 about 1.85 mm±0.05 mm. In another embodiment of the present disclosure, the second diameter of each of the plurality of buffer tubes 136 may vary.

Going further, each of the plurality of buffer tubes 136 encloses the plurality of optical fibers 138. In an embodiment of the present disclosure, each of the plurality of buffer tubes 136 encloses 24 optical fibers. In another embodiment of the present disclosure, each of the plurality of buffer tubes 136 encloses 12 optical fibers (as shown in FIG. 2). Each of the plurality of buffer tubes 136 is a tube for encapsulating the plurality of optical fibers 138. The plurality of buffer tubes 136 provides support and protection to each of the plurality of optical fibers 138 against crush, bend and stretch. In addition, the plurality of buffer tubes 136 protects the plurality of optical fibers 138 and prevents ingression of water inside the stranded core of the optical fiber cable 100. Further, each of the plurality of buffer tubes 136 provides mechanical isolation, physical damage protection and identification of each of the plurality of optical fibers 138. Each of the plurality of buffer tubes 136 is colored. In an embodiment of the present disclosure, the color of plurality of buffer tubes 136 includes red, green, yellow, brown, blue, purple, grey (slate) and orange. In another embodiment of the present disclosure, the color of each of the plurality of buffer tubes 136 may vary. The coloring is done for identification of each of the plurality of buffer tubes 136. In an embodiment of the present disclosure, each of the plurality of buffer tubes 136 is filled with a gel. In an embodiment of the present disclosure, the gel is a thixotropic gel. In an embodiment of the present disclosure, the thixotropic gel prevents ingression of water inside each of the plurality of buffer tubes 136.

Further, each of the plurality of optical fibers 138 is a fiber used for transmitting information as light pulses from one end to another. In addition, each of the plurality of optical fibers 138 is a thin strand of glass capable of transmitting optical signals. Also, each of the plurality of optical fibers 138 is configured to transmit large amounts of information over long distances with relatively low attenuation. Further, each of the plurality of optical fibers 138 includes a core region and a cladding region. The core region is an inner part of an optical fiber and the cladding section is an outer part of the optical fiber. Moreover, the core region is defined by a central longitudinal axis of each of the plurality of optical fibers 138. In addition, the cladding region surrounds the core region.

Each of the plurality of optical fibers 138 has a diameter of about 250 microns. In another embodiment of the present disclosure, the diameter of each of the plurality of optical fibers 138 may vary. In an embodiment of the present disclosure, each of the plurality of optical fibers 138 is a colored optical fiber. In an embodiment of the present disclosure, each of the plurality of optical fibers 138 has a different color. The color of each of the plurality of optical fibers 138 is selected from the group. The group include blue, orange, green, brown, slate, yellow, red, violet, white, black, aqua and pink. The group further includes the above color along with a single ring marking. The group further includes the above color along with the double ring marking. The coloring is done for identification of each of the plurality of optical fibers 138. In another embodiment of the present disclosure, each of the plurality of optical fibers 138 may be of any different color.

In an embodiment of the present disclosure, a number of the plurality of optical fibers 138 in each of the plurality of buffer tubes 136 is 24. In an embodiment of the present disclosure, a total number of the plurality of optical fibers 138 in the plurality of buffer tubes 136 is 192 (8*24=192), when the number of buffer tubes is 8. In another embodiment of the present disclosure, a total number of the plurality of optical fibers 138 in the plurality of buffer tubes 136 is 288 (24*12=288), when the number of buffer tubes is 24 (as shown in FIG. 2). In yet another embodiment of the present disclosure, the number of optical fibers and the number of buffer tubes in the plurality of buffer tubes 136 may vary.

In an embodiment of the present disclosure, each of the plurality of optical fibers 138 has a fiber attenuation of about 0.35 dB/km at a wavelength of about 1310 nanometers. In another embodiment of the present disclosure, each of the plurality of optical fibers 138 has a fiber attenuation of about 0.25 dB/km at a wavelength of 1550 nanometers. In yet another embodiment of the present disclosure, each of the plurality of optical fibers 138 has a fiber attenuation of about 0.4 dB/km at a wavelength of 1625 nanometers. The fiber attenuation corresponds to a loss in optical power as the light travels through each of the plurality of optical fibers 138. Each of the plurality of optical fibers 138 has a dispersion of less than 0.2 ps/√km. The dispersion corresponds to a spreading of the optical signals over time.

The optical fiber cable 100 includes the second layer 140. The second layer 140 is formed of a pair binder yarns. The pair of binder yarn is used for binding of the core of the optical fiber cable 100. The second layer 140 cross helically surrounds the core of the optical fiber cable 100. The pair of binder yarns includes a first binder yarn and a second binder yarn. The first binder yarn is wrapped helically in clockwise direction. The second binder yarn is wrapped helically in anti-clockwise direction. The first binder yarn is aramid binder yarn. The second binder yarn is aramid binder yarn. In an embodiment of the present disclosure, the binder yarn is a normal binder yarn. In another embodiment of the present disclosure, the binder yarn is a zero shrinkage binder yarn. In yet another embodiment of the present disclosure, the binder yarn is a low shrinkage binder yarn. In an embodiment of the present disclosure, the binder yarn is an aramid yarn. In another embodiment of the present disclosure, the binder yarn is formed of any other suitable material.

The optical fiber cable 100 includes the third layer 142. The third layer 142 includes a plurality of water swellable yarns. The plurality of water swellable yarns prevents ingression of water and moisture inside the core of the optical fiber cable 100. In addition, the plurality of water swellable yarns prevents water penetration along the length of the optical fiber cable 100.

In an embodiment of the present disclosure, the third layer 142 of the optical fiber cable 100 is replaced with water blocking aramid binder yarns. In another embodiment of the present disclosure, the third layer 142 of the optical fiber cable 100 is replaced with water blocking rip cords. The use of water blocking aramid binder yarns and water blocking rip cord prevents ingression of water and moisture inside the core of the optical fiber cable 100.

The optical fiber cable 100 includes the fourth layer 144. The fourth layer 144 is a sheathing layer. In an embodiment of the present disclosure, the fourth layer 144 is a sheath formed of at least one of UV proof black medium density polyethylene material and UV proof black high density polyethylene material. In general, medium density polyethylene is a thermoplastic material produced by chromium/silica catalysts, Ziegler-Natta catalysts or metal locene catalysts. In another embodiment of the present disclosure, the fourth layer 144 is formed of any other suitable material. The fourth layer 144 protects the optical fiber cable 100 from harsh environment and harmful UV rays. In addition, the fourth layer 144 has the inherent ability to resist crushes, kinks and tensile stress. In an embodiment of the present disclosure, the fourth layer 144 has a thickness of about 0.5 millimeter. In another embodiment of the present disclosure, the fourth layer 144 may have any suitable thickness.

The optical fiber cable 100 includes the plurality of ripcords 146a-146b. The plurality of ripcord 146a-146b is disposed below the fourth layer 144 and along with the third layer 142 in linear manner. In an embodiment of the present disclosure, the plurality of ripcords 146a-146b lies substantially along the longitudinal axis of the optical fiber cable 100. The plurality of ripcords 146a-146b facilitates access to the plurality of optical fibers 138. In an embodiment of the present disclosure, the plurality of ripcords 146a-146b is formed of a polyester material. In another embodiment of the present disclosure, the plurality of ripcords 146a-146b is formed of any other suitable material. In an embodiment of the present disclosure, the plurality of ripcords 146a-146b is twisted yarns. In an embodiment of the present disclosure, the number of ripcords in the optical fiber cable 100 is 2. In another embodiment of the present disclosure, the number of ripcords in the optical fiber cable 100 may vary.

In an embodiment of the present disclosure, the plurality of rip cords 146a-146b in the optical fiber cable 100 are replaced by yarns having high strength and water blocking characteristics. The yarns facilitate access to the plurality of optical fibers 108 and prevent ingression of water and moisture inside the core of the optical fiber cable 100.

In an embodiment of the present disclosure, the optical fiber cable 100 may have a suitable diameter. In an embodiment of the present disclosure, the diameter of the optical fiber cable 100 is in a range of about 7.7 mm±0.2 mm. In another embodiment of the present disclosure, the diameter of the optical fiber cable 100 may vary. In an embodiment of the present disclosure, the weight of the optical fiber cable 100 is in a range of about 53±10 kilogram per kilometer. In another embodiment of the present disclosure, the weight of the optical fiber cable 100 may vary.

In an embodiment of the present disclosure, each of the plurality of buffer tubes 136 has a packing factor in a range of about 75% to 92%. In general, the packing factor of buffer tube is defined as the ratio of equivalent cross-sectional area of optical fiber bunch to the cross-sectional area formed by inner diameter of the buffer tube. Equivalent cross-sectional area is the area formed by equivalent diameter of the optical fiber bunch. Equivalent diameter is calculated by using the expression as follows: 1.155*Square Root of number of optical fibers per tube*Diameter of optical fiber.

In an embodiment of the present disclosure, the optical fiber cable 100 is blown into a duct having a fill factor in a range of about 54% to 64%. The duct is characterized by an inner diameter and an outer diameter. The inner diameter of the duct is about 10 mm. The outer diameter of the duct is about 14 mm. In general, fill factor is a measure of the acceptability of a cable to be installed in a duct. The fill factor is sometimes defined as the ratio of the cross-sectional area of the cable to the cross-sectional area of the bore of the duct and in the case of a cable and a bore diameter, is sometimes defined as the ratio of the square of cable diameter to square of the bore diameter.

In an embodiment of the present disclosure, the optical fiber cable 100 has a maximum operation tensile strength of about 1000 Newton. In an embodiment of the present disclosure, the minimum bending radius of the optical fiber cable 100 during installation is 20 D and after installation is 10 D. In an embodiment of the present disclosure, the crush resistance of the optical fiber cable 100 is about 500 Newton per 100 millimeter. In an embodiment of the present disclosure, the impact strength of the optical fiber cable 100 is 1 Newton meter. In an embodiment of the present disclosure, the torsion of the optical fiber cable 100 is ±180 degree. In an embodiment of the present disclosure, the temperature performance of the optical fiber cable 100 during installation is in the range of −10 degree Celsius to 50 degree Celsius. In an embodiment of the present disclosure, the temperature performance of the optical fiber cable 100 during operation is in the range of −30 degree Celsius to 70 degree Celsius. In an embodiment of the present disclosure, the temperature performance of the optical fiber cable 100 during storage is in the range of −30 degree Celsius to 70 degree Celsius. In another embodiment of the present disclosure, the optical fiber cable 100 has any suitable value or range of crush resistance, impact strength, torsion, tensile strength, minimum bending radius and temperature performance.

FIG. 2 illustrates a cross sectional view of an optical fiber cable 200, in accordance with another embodiment of the present disclosure. The optical fiber cable 200 is a 288F micro optical fiber cable. In addition, 288F corresponds to 288 optical fibers. Further, the optical fiber cable 200 has a small diameter which makes the optical fiber cable 200 suitable for installation in the micro ducts.

The optical fiber cable 200 includes a central strength member 232, a first layer 234, a first layer of plurality of buffer tubes 236 and a plurality of optical fibers 238. In addition, the optical fiber cable 200 includes a second layer 240, a second layer of plurality of buffer tubes 242 and a plurality of optical fibers 244. Further, the optical fiber cable 200 includes a third layer 246, a fourth layer 248, a fifth layer 250 and a plurality of ripcords 252a-252b.

The optical fiber cable 200 includes the central strength member 232. The central strength member 232 lies substantially along a longitudinal axis of the optical fiber cable 200. In an embodiment of the present disclosure, the central strength member 232 is formed of fiber reinforced plastic. In an embodiment of the present disclosure, the central strength member 232 may be coated with a layer of polyethylene. The central strength member 232 is characterized by a diameter measured along the cross section. In an embodiment of the present disclosure, the diameter of the central strength member 232 along with the polyethylene coating is about 2.8 millimeters. In another embodiment of the present disclosure, the diameter of the central strength member 232 may vary.

The optical fiber cable 200 includes the first layer 234. The first layer 234 surrounds the central strength member 232. The first layer 234 includes a plurality of water swellable yarns 234a-234c helically disposed around the central strength member 232 and the first layer of buffer tubes 236. The plurality of water swellable yarns 234a-234c prevents ingression of water inside the core of the optical fiber cable 200. In an embodiment of the present disclosure, the number of water swellable yarns present in the first layer 234 is 3. In another embodiment of the present disclosure, the number of water swellable yarns present in the first layer 234 is 5. In yet another embodiment of the present disclosure, the number of water swellable yarns present in the first layer 234 may vary.

The optical fiber cable 200 includes the first layer of plurality of buffer tubes 236. The first layer of plurality of buffer tubes 236 are stranded around the first layer 234 in a helical fashion. In an embodiment of the present disclosure, the lay length of the first layer of buffer tubes 236 is in a range of about 80 millimeters-100 millimeters. In general, the lay length is a longitudinal distance along the length of the central strength member 232 required for the plurality of buffer tubes to go all the way around the central strength member 232.

Each of the plurality of buffer tubes 236 is same in construction, structure, dimension, color and design as each of the plurality of buffer tubes 136 (as mentioned in detailed above in the patent application).

Going further, each of the plurality of buffer tubes 236 encloses the plurality of optical fibers 238. In an embodiment of the present disclosure, each of the plurality of buffer tubes 236 encloses 12 optical fibers. Each of the plurality of buffer tubes 236 is a tube for encapsulating the plurality of optical fibers 238. Each of the plurality of optical fibers 238 has a diameter of about 250 microns.

In an embodiment of the present disclosure, a number of the plurality of optical fibers 238 in each of the plurality of buffer tubes 236 is 12. In an embodiment of the present disclosure, a total number of the plurality of optical fibers 238 in the first layer of the plurality of buffer tubes 236 is 108 (9*12=108), when the number of buffer tubes is 9. Each of the plurality of optical fibers 238 has the same color, properties and dimensions as each of the plurality of optical fibers 138 (as explained in detailed above in the patent application).

The optical fiber cable 200 includes the second layer 240. The second layer 240 includes a plurality of water swellable yarns. The plurality of water swellable yarns prevents ingression of water inside the core of the optical fiber cable 200. In addition, the water swellable yarns prevent water penetration along the length of the optical fiber cable 200.

The optical fiber cable 200 includes the second layer of plurality of buffer tubes 242. The second layer of plurality of buffer tubes 242 is stranded around the second layer 240 in a helical fashion. In an embodiment of the present disclosure, the lay length of the second layer of plurality of buffer tubes 242 is in a range of about 100 millimeters-140 millimeters. In an embodiment of the present disclosure, the second layer of plurality of buffer tubes 242 includes 15 buffer tubes.

Each buffer tube of the second layer of plurality of buffer tubes 242 is same in construction, structure, dimension, color and design as each of the plurality of buffer tubes 136 (as mentioned in detailed above in the patent application).

Going further, each of the buffer tubes in the second layer of plurality of buffer tubes 242 encloses the plurality of optical fibers 244. In addition, each of the buffer tubes in the second layer of plurality of buffer tubes 242 encloses 12 optical fibers.

In an embodiment of the present disclosure, a number of the plurality of optical fibers 244 in each of the plurality of buffer tubes in the second layer of plurality of buffer tubes 242 is 12. In an embodiment of the present disclosure, a total number of the plurality of optical fibers 244 in the second layer of plurality of buffer tubes 242 is 180 (15*12=180) when the number of buffer tubes is 15. Each of the plurality of optical fibers 244 has the same color, properties and dimensions as the plurality of optical fibers 138 (as explained in detailed above in the patent application).

The total number of optical fibers present in the optical fiber cable 200 is 288 (108+180=288). In another embodiment of the present disclosure, the total number of optical fibers present in the optical fiber cable 200 may vary.

The optical fiber cable 200 includes the third layer 246. The third layer 246 is formed of a plurality of binder yarns. The binder yarn is used for binding of the core of the optical fiber cable 200. In an embodiment of the present disclosure, the binder yarn is a normal binder yarn. In another embodiment of the present disclosure, the binder yarn is a low shrinkage binder yarn.

The optical fiber cable 200 includes the fourth layer 248. The fourth layer 248 includes a plurality of water swellable yarns. The plurality of water swellable yarns prevents ingression of water and moisture inside the core of the optical fiber cable 200. In addition, the plurality of water swellable yarns prevents water penetration along the length of the optical fiber cable 200.

The optical fiber cable 200 includes the fifth layer 250. The fifth layer 250 is a sheathing layer. In an embodiment of the present disclosure, the fifth layer 250 is a sheath formed of at least one of UV proof black medium density polyethylene material and UV proof black high density polyethylene material. The fifth layer 250 protects the optical fiber cable 200 from harsh environment and harmful UV rays. In an embodiment of the present disclosure, the fifth layer 250 has a thickness of about 0.5 millimeters. In addition, the fifth layer 250 has the inherent ability to resist crushes, kinks and tensile stress.

The optical fiber cable 200 includes the plurality of ripcords 252a-252b. The plurality of ripcords 252a-252b is disposed between the fifth layer 250 and the fourth layer 248. In an embodiment of the present disclosure, the plurality of ripcords 252a-252b lies substantially along the longitudinal axis of the optical fiber cable 200. Each of the plurality of ripcords 252 facilitates access to the plurality of optical fibers.

In an embodiment of the present disclosure, the optical fiber cable 200 may have a suitable diameter. In an embodiment of the present disclosure, the diameter of the optical fiber cable 200 is in a range of about 9.2 millimeters±0.2 millimeters. In another embodiment of the present disclosure, the diameter of the optical fiber cable 200 may vary. In an embodiment of the present disclosure, the weight of the optical fiber cable 200 is in a range of about 72±10 kilogram per kilometer. In another embodiment of the present disclosure, the weight of the optical fiber cable 200 may vary.

In an embodiment of the present disclosure, the optical fiber cable 200 has a maximum operation tensile strength of about 350 Newton. In an embodiment of the present disclosure, the optical fiber cable 200 has a maximum installation tensile strength of about 1250 Newton. In an embodiment of the present disclosure, the minimum bending radius of the optical fiber cable 200 during installation is 20 D and after installation is 10 D. In an embodiment of the present disclosure, the crush resistance of the optical fiber cable 200 is about 700 Newton per 100 millimeter. In an embodiment of the present disclosure, the impact strength of the optical fiber cable 200 is 1 Newton meter. In an embodiment of the present disclosure, the torsion of the optical fiber cable 200 is ±180 degree. In an embodiment of the present disclosure, the temperature performance of the optical fiber cable 200 during installation is in the range of −30 degree Celsius to 70 degree Celsius. In an embodiment of the present disclosure, the temperature performance of the optical fiber cable 200 during installation is in the range of −10 degree Celsius to 70 degree Celsius. In an embodiment of the present disclosure, the temperature performance of the optical fiber cable 200 during service is in the range of −10 degree Celsius to 70 degree Celsius. In an embodiment of the present disclosure, the temperature performance of the optical fiber cable 200 during storage is in the range of −30 degree Celsius to 70 degree Celsius. In another embodiment of the present disclosure, the optical fiber cable 200 has any suitable value or range of crush resistance, impact strength, torsion, tensile strength, minimum bending radius and temperature performance.

In an embodiment of the present disclosure, the optical fiber cable 200 with 288 fibers and average diameter of 9.3 millimeter went through one or more tests to check the blowing performance of the optical fiber cable 200. In another embodiment of the present disclosure, a mini optical fiber cable with 288 fibers and average diameter of 10.2 millimeter went through the one or more tests to check the blowing performance of the mini optical fiber cable. In yet another embodiment of the present disclosure, the mini optical fiber cable with 24 fibers and average diameter of 4.3 millimeters went through the one or more tests to check the blowing performance of the mini optical fiber cable.

In an embodiment of the present disclosure, each of the three cables has to pass one or more pre-defined criteria of the test. A first pre-defined criterion of the one or more pre-defined criteria is that the cables should blow all the way in the 2000 meter route. A second pre-defined criterion of the one or more pre-defined criteria is that the route must be completed under 60 minutes. A third pre-defined criterion of the one or more pre-defined criteria is to stop the trial when the speed of blowing is below 20 meter per minute. A fourth pre-defined criterion of the one or more pre-defined criteria is that the cables should be blown out under 60 minutes. A fifth pre-defined criterion of the one or more pre-defined criteria is that no lubricant for the mini cables having less than 144 fibers should be used.

In an embodiment of the present disclosure, the track used for the testing of the one or more optical fiber cables includes 2 loops. Each loop of the two loops is used to measure 1000 meter in length providing a total track distance of 2000 meter. Further, the track includes three end loops and each end loop is equally spaced at 500 meter. In addition to the end loop, the track includes 14 chambers, 4 chambers of which stimulate two road crossings.

In an embodiment of the present disclosure, the standard equipment used for the test includes a compressor, a blowing machine, and an air flow meter. The compressor is Kaersar Mobil air M17 fitted with an inline air intercooler. The blowing machine is a CBS air stream C1700. The air flow meter is a suitable in-line air flow meter. Further, a new unused micro duct is used for each of the one or more cable for the consistency with the test results.

In an embodiment of the present disclosure, one or more blowing equipment was used for the trials. The one or more equipment include a Minijet and a M17 compressor. In an embodiment of the present disclosure, the one or more cables were tested at some predefined distance interval to check the blowing performance of the one or more cables.

Test Cable 1: 288f mini cable with an average diameter of 9.3 mm.

The first cable for the test includes the optical fiber cable 200. The type of tube used for the optical fiber cable 200 is 18/14 mm. The route used for the optical fiber cable 200 includes a distance of 1900 meter. The number of fiber in the optical fiber cable 200 is 288. The data corresponding to the test results of the optical fiber cable 200 includes distance, time, speed and air flow of the blowing operation.

The optical fiber cable 200 is blown to a distance of 50 meter in 1.06 minutes with a speed of 60 meter per minute. The optical fiber cable 200 is blown to the next distance from 50 meter to 100 meter in 1.58 minutes with the speed of 59 meter per minutes. The optical fiber cable 200 is blown to the next distance from 100 meter to 150 meter in 2.54 minutes with the speed of 52 meter per minutes. The optical fiber cable 200 is blown to the next distance from 150 meter to 200 meter in 3.58 minutes with the speed of 48 meter per minutes with an air flow of 2 bar. The optical fiber cable 200 is blown to the next distance from 200 meter to 250 meter in 5.05 minutes with the speed of 50 meter per minutes with an air flow of 4 bar. The optical fiber cable 200 is blown to the next distance from 250 meter to 300 meter in 6.04 minutes with the speed of 58 meter per minutes with an air flow of 6 bar. The optical fiber cable 200 is blown to the next distance from 300 meter to 350 meter in 6.58 minutes with the speed of 58 meter per minutes with an air flow of 6 bar. The optical fiber cable 200 is blown to the next distance from 350 meter to 400 meter in 7.54 minutes with the speed of 57 meter per minutes with an air flow of 6 bar. The optical fiber cable 200 is blown to the next distance from 400 meter to 450 meter in 8.53 minutes with the speed of 55 meter per minutes with an air flow of 6 bar. The optical fiber cable 200 is blown to the next distance from 450 meter to 500 meter in 9.53 minutes with the speed of 53 meter per minutes with an air flow of 6 bar. The optical fiber cable 200 is blown to the next distance from 500 meter to 550 meter in 10.55 minutes with the speed of 55 meter per minutes with an air flow of 7 bar. The optical fiber cable 200 is blown to the next distance from 550 meter to 600 meter in 11.55 minutes with the speed of 52 meter per minutes with an air flow of 7 bar. The optical fiber cable 200 is blown to the next distance from 600 meter to 650 meter in 12.48 minutes with the speed of 58 meter per minutes with an air flow of 7 bar. The optical fiber cable 200 is blown to the next distance from 650 meter to 700 meter in 13.49 minutes with the speed of 58 meter per minutes with an air flow of 7 bar. The optical fiber cable 200 is blown to the next distance from 700 meter to 750 meter in 14.47 minutes with the speed of 58 meter per minutes with an air flow of 7 bar. The optical fiber cable 200 is blown to the next distance from 750 meter to 800 meter in 15.47 minutes with the speed of 58 meter per minutes with an air flow of 7 bar. The optical fiber cable 200 is blown to the next distance from 800 meter to 850 meter in 16.47 minutes with the speed of 58 meter per minutes with an air flow of 8 bar. The optical fiber cable 200 is blown to the next distance from 850 meter to 900 meter in 17.46 minutes with the speed of 58 meter per minutes with an air flow of 8 bar. The optical fiber cable 200 is blown to the next distance from 900 meter to 950 meter in 18.47 minutes with the speed of 57 meter per minutes with an air flow of 8 bar. The optical fiber cable 200 is blown to the next distance from 950 meter to 1000 meter in 19.44 minutes with the speed of 56 meter per minutes with an air flow of 8 bar. The optical fiber cable 200 is blown to the next distance from 1000 meter to 1050 meter in 20.44 minutes with the speed of 53 meter per minutes with an air flow of 8 bar. The optical fiber cable 200 is blown to the next distance from 1050 meter to 1100 meter in 21.46 minutes with the speed of 52 meter per minutes with an air flow of 8 bar. The optical fiber cable 200 is blown to the next distance from 1100 meter to 1150 meter in 22.42 minutes with the speed of 58 meter per minutes with an air flow of 9 bar. The optical fiber cable 200 is blown to the next distance from 1150 meter to 1200 meter in 23.36 minutes with the speed of 60 meter per minutes with an air flow of 9 bar. The optical fiber cable 200 is blown to the next distance from 1200 meter to 1250 meter in 24.36 minutes with the speed of 58 meter per minutes with an air flow of 9 bar. The optical fiber cable 200 is blown to the next distance from 1250 meter to 1300 meter in 25.35 minutes with the speed of 55 meter per minutes with an air flow of 9 bar. The optical fiber cable 200 is blown to the next distance from 1300 meter to 1350 meter in 26.40 minutes with the speed of 55 meter per minutes with an air flow of 9 bar. The optical fiber cable 200 is blown to the next distance from 1350 meter to 1400 meter in 27.39 minutes with the speed of 55 meter per minutes with an air flow of 10 bar. The optical fiber cable 200 is blown to the next distance from 1400 meter to 1450 meter in 28.40 minutes with the speed of 53 meter per minutes with an air flow of 10 bar. The optical fiber cable 200 is blown to the next distance from 1450 meter to 1500 meter in 29.47 minutes with the speed of 53 meter per minutes with an air flow of 10 bar. The optical fiber cable 200 is blown to the next distance from 1500 meter to 1550 meter in 30.50 minutes with the speed of 52 meter per minutes with an air flow of 11 bar. The optical fiber cable 200 is blown to the next distance from 1550 meter to 1600 meter in 31.55 minutes with the speed of 50 meter per minutes with an air flow of 11 bar. The optical fiber cable 200 is blown to the next distance from 1600 meter to 1650 meter in 33.03 minutes with the speed of 45 meter per minutes with an air flow of 11 bar. The optical fiber cable 200 is blown to the next distance from 1650 meter to 1700 meter in 34.17 minutes with the speed of 45 meter per minutes with an air flow of 12 bar. The optical fiber cable 200 is blown to the next distance from 1700 meter to 1750 meter in 35.22 minutes with the speed of 50 meter per minutes with an air flow of 12 bar. The optical fiber cable 200 is blown to the next distance from 1750 meter to 1800 meter in 36.28 minutes with the speed of 46 meter per minutes with an air flow of 12 bar. The optical fiber cable 200 is blown to the next distance from 1800 meter to 1827 meter in 37.05 minutes with the speed of 50 meter per minutes with an air flow of 13 bar.

The optical fiber cable 200 passed the test. The average speed calculated for blowing the optical fiber cable 200 was 50.97 meter per minute.

Test Cable 2: 288f mini cable with an average diameter of 10.2 mm.

The second cable for the test includes the mini optical fiber cable. The type of tube used for the mini optical fiber cable is 18/14 mm. The route used for the mini optical fiber cable includes a distance of 1900 meter. The number of fiber in the mini optical fiber cable is 288. The data corresponding to the test results of the mini optical fiber cable includes distance, time, speed and air flow of the blowing operation.

The mini optical fiber cable is blown to a distance of 50 meter in 1.03 minutes with a speed of 50 meter per minute. The mini optical fiber cable is blown to the next distance from 50 meter to 100 meter in 2.11 minutes with the speed of 44 meter per minutes. The mini optical fiber cable is blown to the next distance from 100 meter to 150 meter in 3.28 minutes with the speed of 38 meter per minutes. The mini optical fiber cable is blown to the next distance from 150 meter to 200 meter in 4.56 minutes with the speed of 37 meter per minutes with an air flow of 5 bar. The mini optical fiber cable is blown to the next distance from 200 meter to 250 meter in 6.21 minutes with the speed of 33 meter per minutes with an air flow of 7 bar. The mini optical fiber cable is blown to the next distance from 250 meter to 300 meter in 7.34 minutes with the speed of 50 meter per minutes with an air flow of 8 bar. The mini optical fiber cable is blown to the next distance from 300 meter to 350 meter in 8.41 minutes with the speed of 44 meter per minutes with an air flow of 8 bar. The mini optical fiber cable is blown to the next distance from 350 meter to 400 meter in 9.58 minutes with the speed of 38 meter per minutes with an air flow of 8 bar. The mini optical fiber cable is blown to the next distance from 400 meter to 450 meter in 11.08 minutes with the speed of 44 meter per minutes with an air flow of 9 bar. The mini optical fiber cable is blown to the next distance from 450 meter to 500 meter in 12.23 minutes with the speed of 38 meter per minutes with an air flow of 9 bar. The mini optical fiber cable is blown to the next distance from 500 meter to 550 meter in 13.47 minutes with the speed of 35 meter per minutes with an air flow of 9 bar. The mini optical fiber cable is blown to the next distance from 550 meter to 600 meter in 14.58 minutes with the speed of 43 meter per minutes with an air flow of 10 bar. The mini optical fiber cable is blown to the next distance from 600 meter to 650 meter in 16.12 minutes with the speed of 40 meter per minutes with an air flow of 10 bar. The mini optical fiber cable is blown to the next distance from 650 meter to 700 meter in 17.26 minutes with the speed of 40 meter per minutes with an air flow of 10 bar. The mini optical fiber cable is blown to the next distance from 700 meter to 750 meter in 18.34 minutes with the speed of 42 meter per minutes with an air flow of 11 bar. The mini optical fiber cable is blown to the next distance from 750 meter to 800 meter in 19.46 minutes with the speed of 42 meter per minutes with an air flow of 11 bar. The mini optical fiber cable is blown to the next distance from 800 meter to 850 meter in 21.02 minutes with the speed of 40 meter per minutes with an air flow of 11 bar. The mini optical fiber cable is blown to the next distance from 850 meter to 900 meter in 22.21 minutes with the speed of 40 meter per minutes. with an air flow of 11 bar. The mini optical fiber cable is blown to the next distance from 900 meter to 950 meter in 23.36 minutes with the speed of 45 meter per minutes with an air flow of 13 bar. The mini optical fiber cable is blown to the next distance from 950 meter to 1000 meter in 24.52 minutes with the speed of 38 meter per minutes with an air flow of 13 bar. The mini optical fiber cable is blown to the next distance from 1000 meter to 1050 meter in 26.12 minutes with the speed of 37 meter per minutes with an air flow of 13 bar. The mini optical fiber cable is blown to the next distance from 1050 meter to 1100 meter in 27.36 minutes with the speed of 38 meter per minutes with an air flow of 13 bar. The mini optical fiber cable is blown to the next distance from 1100 meter to 1150 meter in 29.00 minutes with the speed of 35 meter per minutes with an air flow of 13 bar. The mini optical fiber cable is blown to the next distance from 1150 meter to 1200 meter in 30.27 minutes with the speed of 35 meter per minutes with an air flow of 13 bar. The mini optical fiber cable is blown to the next distance from 1200 meter to 1250 meter in 32.00 minutes with the speed of 33 meter per minutes with an air flow of 13 bar. The mini optical fiber cable is blown to the next distance from 1250 meter to 1300 meter in 33.35 minutes with the speed of 31 meter per minutes with an air flow of 13 bar. The mini optical fiber cable is blown to the next distance from 1300 meter to 1350 meter in 35.12 minutes with the speed of 31 meter per minutes with an air flow of 13 bar. The mini optical fiber cable is blown to the next distance from 1350 meter to 1400 meter in 36.53 minutes with the speed of 30 meter per minutes with an air flow of 13 bar. The mini optical fiber cable is blown to the next distance from 1400 meter to 1450 meter in 38.34 minutes with the speed of 29 meter per minutes with an air flow of 13 bar. The mini optical fiber cable is blown to the next distance from 1450 meter to 1500 meter in 40.22 minutes with the speed of 29 meter per minutes with an air flow of 13 bar. The mini optical fiber cable is blown to the next distance from 1500 meter to 1550 meter in 42.12 minutes with the speed of 29 meter per minutes with an air flow of 13 bar. The mini optical fiber cable is blown to the next distance from 1550 meter to 1600 meter in 44.03 minutes with the speed of 28 meter per minutes with an air flow of 13 bar. The mini optical fiber cable is blown to the next distance from 1600 meter to 1650 meter in 45.57 minutes with the speed of 28 meter per minutes with an air flow of 13 bar. The mini optical fiber cable is blown to the next distance from 1650 meter to 1700 meter in 48.03 minutes with the speed of 25 meter per minutes with an air flow of 13 bar. The mini optical fiber cable is blown to the next distance from 1700 meter to 1750 meter in 50.24 minutes with the speed of 22 meter per minutes with an air flow of 13 bar. The mini optical fiber cable is blown to the next distance from 1750 meter to 1800 meter in 53.00 minutes with the speed of 19 meter per minutes with an air flow of 13 bar. The mini optical fiber cable is blown to the next distance from 1800 meter to 1824 meter in 54.31 minutes with the speed of 19 meter per minutes with an air flow of 13 bar.

The mini optical fiber cable with 288 fibers failed the test. The mini optical fiber cable failed in the test due to the slow speed. The average speed calculated for blowing the mini optical fiber cable was 34.90 meter per minute.

Test Cable 3: 24f mini cable with an average diameter of 4.3 mm.

The third cable for the test includes the mini optical fiber cable. The type of tube used for the mini optical fiber cable is 10/7 mm. The route used for the mini optical fiber cable includes a distance of 1900 meter. The number of fiber in the mini optical fiber cable is 24. The data corresponding to the test results of the mini optical fiber cable includes distance, time, speed and air flow of the blowing operation.

The mini optical fiber cable is blown to a distance of 50 meter in 0.56 minutes with a speed of 65 meter per minute. The mini optical fiber cable is blown to the next distance from 50 meter to 100 meter in 1.42 minutes with the speed of 65 meter per minutes. The mini optical fiber cable is blown to the next distance from 100 meter to 150 meter in 2.34 minutes with the speed of 65 meter per minutes. The mini optical fiber cable is blown to the next distance from 150 meter to 200 meter in 3.27 minutes with the speed of 50 meter per minutes with an air flow of 0 bar. The mini optical fiber cable is blown to the next distance from 200 meter to 250 meter in 4.32 minutes with the speed of 60 meter per minutes with an air flow of 1 bar. The mini optical fiber cable is blown to the next distance from 250 meter to 300 meter in 5.27 minutes with the speed of 60 meter per minutes with an air flow of 1 bar. The mini optical fiber cable is blown to the next distance from 300 meter to 350 meter in 6.23 minutes with the speed of 50 meter per minutes with an air flow of 2 bar. The mini optical fiber cable is blown to the next distance from 350 meter to 400 meter in 7.23 minutes with the speed of 60 meter per minutes with an air flow of 3 bar. The mini optical fiber cable is blown to the next distance from 400 meter to 450 meter in 8.27 minutes with the speed of 50 meter per minutes with an air flow of 3 bar. The mini optical fiber cable is blown to the next distance from 450 meter to 500 meter in 9.26 minutes with the speed of 50 meter per minutes with an air flow of 4 bar. The mini optical fiber cable is blown to the next distance from 500 meter to 550 meter in 10.31 minutes with the speed of 50 meter per minutes with an air flow of 5 bar. The mini optical fiber cable is blown to the next distance from 550 meter to 600 meter in 11.36 minutes with the speed of 50 meter per minutes with an air flow of 5 bar. The mini optical fiber cable is blown to the next distance from 600 meter to 650 meter in 12.36 minutes with the speed of 50 meter per minutes with an air flow of 6 bar. The mini optical fiber cable is blown to the next distance from 650 meter to 700 meter in 13.47 minutes with the speed of 50 meter per minutes with an air flow of 7 bar. The mini optical fiber cable is blown to the next distance from 700 meter to 750 meter in 14.52 minutes with the speed of 45 meter per minutes with an air flow of 7 bar. The mini optical fiber cable is blown to the next distance from 750 meter to 800 meter in 16.02 minutes with the speed of 40 meter per minutes with an air flow of 7 bar. The mini optical fiber cable is blown to the next distance from 800 meter to 850 meter in 17.02 minutes with the speed of 55 meter per minutes. with an air flow of 8 bar. The mini optical fiber cable is blown to the next distance from 850 meter to 900 meter in 18.05 minutes with the speed of 50 meter per minutes. with an air flow of 8 bar. The mini optical fiber cable is blown to the next distance from 900 meter to 950 meter in 19.06 minutes with the speed of 50 meter per minutes with an air flow of 9 bar. The mini optical fiber cable is blown to the next distance from 950 meter to 1000 meter in 20.12 minutes with the speed of 60 meter per minutes with an air flow of 10 bar. The mini optical fiber cable is blown to the next distance from 1000 meter to 1050 meter in 21.13 minutes with the speed of 45 meter per minutes with an air flow of 10 bar. The mini optical fiber cable is blown to the next distance from 1050 meter to 1100 meter in 22.15 minutes with the speed of 60 meter per minutes with an air flow of 11 bar. The mini optical fiber cable is blown to the next distance from 1100 meter to 1150 meter in 23.07 minutes with the speed of 52 meter per minutes with an air flow of 11 bar. The mini optical fiber cable is blown to the next distance from 1150 meter to 1200 meter in 24.14 minutes with the speed of 45 meter per minutes with an air flow of 11 bar. The mini optical fiber cable is blown to the next distance from 1200 meter to 1250 meter in 25.21 minutes with the speed of 50 meter per minutes with an air flow of 12 bar. The mini optical fiber cable is blown to the next distance from 1250 meter to 1300 meter in 26.32 minutes with the speed of 53 meter per minutes with an air flow of 13 bar. The mini optical fiber cable is blown to the next distance from 1300 meter to 1350 meter in 27.13 minutes with the speed of 50 meter per minutes with an air flow of 13 bar. The mini optical fiber cable is blown to the next distance from 1350 meter to 1400 meter in 28.47 minutes with the speed of 42 meter per minutes with an air flow of 13 bar. The mini optical fiber cable is blown to the next distance from 1400 meter to 1450 meter in 30.07 minutes with the speed of 28 meter per minutes with an air flow of 13 bar. The mini optical fiber cable is blown to the next distance from 1450 meter to 1500 meter in 31.40 minutes with the speed of 33 meter per minutes with an air flow of 13 bar. The mini optical fiber cable is blown to the next distance from 1500 meter to 1550 meter in 33.20 minutes with the speed of 28 meter per minutes with an air flow of 13 bar. The mini optical fiber cable is blown to the next distance from 1550 meter to 1600 meter in 35.19 minutes with the speed of 25 meter per minutes with an air flow of 13 bar. The mini optical fiber cable is blown to the next distance from 1600 meter to 1632 meter in 36.48 minutes with the speed of 25 meter per minutes with an air flow of 13 bar.

The mini optical fiber cable with 24 fibers passed the test. The average speed calculated for blowing the mini optical fiber cable was 51.16 meter per minute.

It may be noted in reference with the above mentioned embodiments, performance and test results of 288 fiber optical fiber cable 200 (FIG. 2) (included above as part of table-1, table-2 and table-3 embodiments) that the 192 fiber optical fiber cable 100 (FIG. 1) shows similar blowing performance results as 288 fiber optical fiber cable 200. The blowing performance of 192 fiber optical fiber cable 100 is similarly optimized as 288 fiber optical fiber cable 200. Further, those skilled in the art would appreciate that the 192 fiber optical fiber cable 100 (FIG. 1) is similarly optimized as 288 fiber optical fiber cable 200 (FIG. 2) as both the optical fiber cable (100, 200) use similar dual layer buffer tubes.

Further, it may be noted that in FIG. 1, the optical fiber cable 100 includes eight buffer tubes; and in other embodiment, the optical fiber cable 200 includes twenty four buffer tubes; however, those skilled in the art would appreciate that more or less number of buffer tubes are included in the optical fiber cable 100.

The micro optical fiber cable has numerous advantages over the prior art. The micro optical fiber cable is easy to installer in small ducts. The optical fiber cable includes a dual layer of buffer tubes with low thickness of polycarbonate and polybutylene terephthalate. The dual layer buffer tubes can be used for other configurations with 250 micron optical fibers and 200 micron optical fibers to reduce cable diameter which in turn improves the blowing performance. The small diameter of optical fiber cable enables easier installation of the micro optical fiber cable in the small ducts. Further, the small diameter increases the blowing performance of the micro optical fiber cable.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable comprising:
   a central strength member lying substantially along a longitudinal axis of the optical fiber cable, wherein the central strength member is formed of fiber reinforced plastic, wherein the central strength member has a diameter of about 3.0 mm;
   a first layer wrapped helically around the central strength member, wherein the first layer is formed of a plurality of water swellable yarns;
   a plurality of buffer tubes stranded helically around the first layer, wherein each of the plurality of buffer tubes encloses a plurality of optical fibers,
      wherein each of the plurality of buffer tubes is formed of a combination of two sub layers having different material, wherein each of the plurality of buffer tubes has a first sub layer and a second sub layer; wherein the first sub layer is formed of polycarbonate, wherein the second sub layer is formed of polybutylene terephthalate;
   a second layer, wherein the second layer cross helically surrounds a core of the optical fiber cable, wherein the second layer is formed of a pair of binder yarns, wherein the pair of binder yarn comprising:
      a first binder yarn, wherein the first binder yarn is wrapped helically in clockwise direction; and
      a second binder yarn, wherein the second binder yarn is wrapped helically in anti-clockwise direction;
   a third layer, wherein the third layer is wrapped helically around the core of the optical fiber cable, wherein the third layer is formed of a plurality of water swellable yarns; and
   a fourth layer surrounding the third layer, wherein the fourth layer is formed of high density polyethylene, wherein the optical fiber cable has a diameter of about 7.7 mm±0.2 mm.

2. The optical fiber cable as recited in claim 1, wherein each of the plurality of buffer tubes has a first diameter of about 1.55 mm±0.05 mm, wherein each of the plurality of buffer tubes has a second diameter of about 1.85 mm±0.05 mm.

3. The optical fiber cable as recited in claim 1, wherein the first sub layer has a thickness of about 75 microns±10 microns, wherein the first sub layer has a density of about 1.2 gm/cm$^3$.

4. The optical fiber cable as recited in claim 1, wherein the second sub layer has a thickness of about 75 microns±10 microns, wherein the second sub layer has a density of about 1.31 gm/cm$^3$.

5. The optical fiber cable as recited in claim 1, wherein the plurality of buffer tubes is eight, wherein the plurality of optical fibers in each of the plurality of buffer tubes is twenty four, wherein each of the plurality of optical fibers has a diameter of about 250 microns.

6. The optical fiber cable as recited in claim 1, wherein the fourth layer has a thickness in a range of about 0.4 mm to 0.6 mm, wherein the fourth layer has a density in a range of about 0.90 gm/cm$^3$ to 0.96 gm/cm$^3$.

7. The optical fiber cable as recited in claim 1, wherein the central strength member is a solid pultrusion type fiber reinforced plastic, wherein the central strength member is coated with a polyethylene layer, wherein the central strength member is coated to accommodate plurality of buffer tubes.

8. The optical fiber cable as recited in claim 1, wherein the first binder yarn is aramid binder yarn, wherein the second binder yarn is aramid binder yarn.

9. The optical fiber cable as recited in claim 1, further comprising a plurality of ripcords, wherein the plurality of ripcords are positioned below the fourth layer.

10. The optical fiber cable as recited in claim 1, wherein the optical fiber cable is blown into a duct, wherein the duct is having an inner diameter of about 10 mm and outer diameter of about 14 mm, wherein the optical fiber cable has a fill factor in a range of about 54% to 64% in the duct.

11. The optical fiber cable as recited in claim 1, wherein each of the plurality of buffer tubes has a packing factor in a range of about 75% to 92%, wherein the packing factor is defined as ratio of equivalent cross sectional area of fiber bunch to inner cross sectional area of a buffer tube of the plurality of buffer tubes, wherein the equivalent cross sectional area is area formed by equivalent diameter of fiber bunch which is calculated by formula, 1.155*Square root of number fibers per tube*Diameter of the fiber.

12. An optical fiber cable comprising:
   a central strength member lying substantially along a longitudinal axis of the optical fiber cable, wherein the central strength member is formed of fiber reinforced plastic, wherein the central strength member has a diameter of about 3.0 mm;
   a first layer wrapped helically around the central strength member, wherein the first layer is formed of a plurality of water swellable yarns;
   a plurality of buffer tubes stranded helically around the first layer, wherein each of the plurality of buffer tubes encloses a plurality of optical fibers,
      wherein each of the plurality of buffer tubes has a first diameter of about 1.55 mm±0.05 mm, wherein each of the plurality of buffer tubes has a second diameter of about 1.85 mm±0.05 mm,
      wherein each of the plurality of buffer tubes is formed of a combination of two sub layers having different material, wherein each of the plurality of buffer tubes has a first sub layer and a second sub layer; wherein the first sub layer is formed of polycarbonate, wherein the second sub layer is formed of polybutylene terephthalate;

a second layer, wherein the second layer cross helically surrounds a core of the optical fiber cable, wherein the second layer is formed of a pair of binder yarns, wherein the pair of binder yarns comprising:
 a first binder yarn, wherein the first binder yarn is wrapped helically in clockwise direction; and
 a second binder yarn, wherein the second binder yarn is wrapped helically in anti-clockwise direction;

a third layer wrapped helically around the core of the optical fiber cable, wherein the third layer is formed of a plurality of water swellable yarns; and a fourth layer surrounding the third layer, wherein the fourth layer is formed of high density polyethylene, wherein the fourth layer has a thickness in a range of about 0.4 mm to 0.6 mm, wherein the fourth layer has a density in a range of about 0.90 gm/cm$^3$ to 0.96 gm/cm$^3$,
 wherein the optical fiber cable has a diameter of about 7.7 mm±0.2 mm.

13. The optical fiber cable as recited in claim 12, wherein the first sub layer has a thickness of about 75 microns±10 microns, wherein the first sub layer has a density of about 1.2 gm/cm$^3$.

14. The optical fiber cable as recited in claim 12, wherein the second sub layer has a thickness of about 75 microns±10 microns, wherein the second sub layer has a density of about 1.31 gm/cm$^3$.

15. The optical fiber cable as recited in claim 12, wherein the plurality of buffer tubes is eight, wherein the plurality of optical fibers in each of the plurality of buffer tubes is twenty four, wherein each of the plurality of optical fibers has a diameter of about 250 microns.

16. The optical fiber cable as recited in claim 12, wherein the central strength member is a solid pultrusion type fiber reinforced plastic, wherein the central strength member is coated with a polyethylene layer, wherein the central strength member is coated to accommodate the plurality of buffer tubes.

17. The optical fiber cable as recited in claim 12, wherein the first binder yarn is aramid binder yarn, wherein the second binder yarn is aramid binder yarn.

18. The optical fiber cable as recited in claim 12, further comprises a plurality of ripcords, wherein the plurality of ripcords is positioned below the fourth layer and along with the third layer in a linear manner.

19. An optical fiber cable comprising:
a central strength member lying substantially along a longitudinal axis of the optical fiber cable, wherein the central strength member is formed of fiber reinforced plastic, wherein the central strength member has a diameter of about 3.0 mm;

a first layer wrapped helically around the central strength member, wherein the first layer is formed of a plurality of water swellable yarns;

a plurality of buffer tubes stranded helically around the first layer,
 wherein each of the plurality of buffer tubes has a first diameter of about 1.55 mm±0.05 mm, wherein each of the plurality of buffer tubes has a second diameter of about 1.85 mm±0.05 mm,
 wherein each of the plurality of buffer tubes is formed of a combination of two sub layers having different material, wherein each of the plurality of buffer tubes has a first sub layer and a second sub layer; wherein the first sub layer is formed of polycarbonate,
 wherein the first sub layer has a thickness of about 75 microns±10 microns, wherein the first sub layer has a density of about 1.2 gm/cm$^3$,
 wherein the second sub layer is formed of polybutylene terephthalate, wherein the second sub layer has a thickness of about 75 microns±10 microns, wherein the second sub layer has a density of about 1.31 gm/cm$^3$,
 wherein each of the plurality of buffer tubes encloses a plurality of optical fibers, wherein the plurality of buffer tubes is eight, wherein the plurality of optical fibers in each of the plurality of buffer tubes is twenty four, wherein each of the plurality of optical fibers has a diameter of about 250 microns;

a second layer, wherein the second layer cross helically surrounds a core of the optical fiber cable, wherein the second layer is formed of a pair of binder yarns, wherein the pair of binder yarn comprising:
a first binder yarn, wherein the first binder yarn is wrapped helically in clockwise direction; and
a second binder yarn, wherein the second binder yarn is wrapped helically in anti-clockwise direction;

a third layer wrapped helically around the core of the optical fiber cable, wherein the third layer is formed of a plurality of water swellable yarns; and a fourth layer surrounding the third layer, wherein the fourth layer is formed of high density polyethylene, wherein the fourth layer has a thickness in a range of about 0.4 mm to 0.6 mm, wherein the fourth layer has a density in a range of about 0.90 gm/cm$^3$ to 0.96 gm/cm$^3$,
 wherein the optical fiber cable has a diameter of about 7.7 mm±0.2 mm.

* * * * *